United States Patent [19]
Ledet

[11] Patent Number: 5,263,575
[45] Date of Patent: * Nov. 23, 1993

[54] DRIVE SPROCKET SYSTEMS FOR REGISTRATION OF SPACED METAL LAMINATIONS ACROSS THE WIDTH OF PLASTIC CONVEYOR BELTS

[75] Inventor: Brent A. Ledet, Metairie, La.

[73] Assignee: The Laitram Corporation, Harahan, La.

[*] Notice: The portion of the term of this patent subsequent to Dec. 24, 2008 has been disclaimed.

[21] Appl. No.: 948,330

[22] Filed: Sep. 25, 1992

Related U.S. Application Data

[63] Continuation-in-part of Ser. No. 774,353, Oct. 10, 1991, Pat. No. 5,170,883, which is a continuation-in-part of Ser. No. 529,511, May 29, 1990, Pat. No. 5,074,406.

[51] Int. Cl.$^5$ .............................................. B65G 23/06
[52] U.S. Cl. ................... 198/834; 474/157; 474/164
[58] Field of Search ............ 198/834; 474/156, 157, 474/164

[56] References Cited

U.S. PATENT DOCUMENTS

| | | |
|---|---|---|
| 1,835,406 | 12/1931 | Kirsten . |
| 3,724,285 | 4/1973 | Lapeyre ............................... 198/834 |
| 4,865,183 | 9/1989 | Hodlewsky et al. ................ 198/834 |
| 5,020,656 | 6/1991 | Faulkner ............................. 198/834 |
| 5,074,406 | 12/1991 | Gundlach ........................... 198/834 |
| 5,156,263 | 10/1992 | Ledet .................................. 198/834 |
| 5,170,883 | 12/1992 | Ledet et al. ........................ 198/834 |

Primary Examiner—Joseph E. Valenza
Attorney, Agent, or Firm—Laurence R. Brown; James T. Cronvich

[57] ABSTRACT

Sprocket drive mechanisms formed of metal lamina engage belt drive surfaces formed in a modular plastic conveyor belt. The lamina are positioned axially along a rotary drive shaft to mate with drive surfaces extending across the width of the belt. Belt wear from the metal sprocket lamina is reduced by floating at least one lamina axially along the drive shaft to conform with belt positioning under loading and other dynamic conditions. Spacers for axially separating the lamina for registration with belt drive surfaces when mounting the belt on the sprocket drive may be removed after registration, thereby keeping the metal drive assembly lighter with less inertia to further reduce wear. Alternatively light weight laminar spacers disposed axially along the shaft are interlocked to the sprocket lamina to maintain a fixed spacing while permitting the assembly and/or separate sprocket lamina to float axially on the shaft.

7 Claims, 3 Drawing Sheets

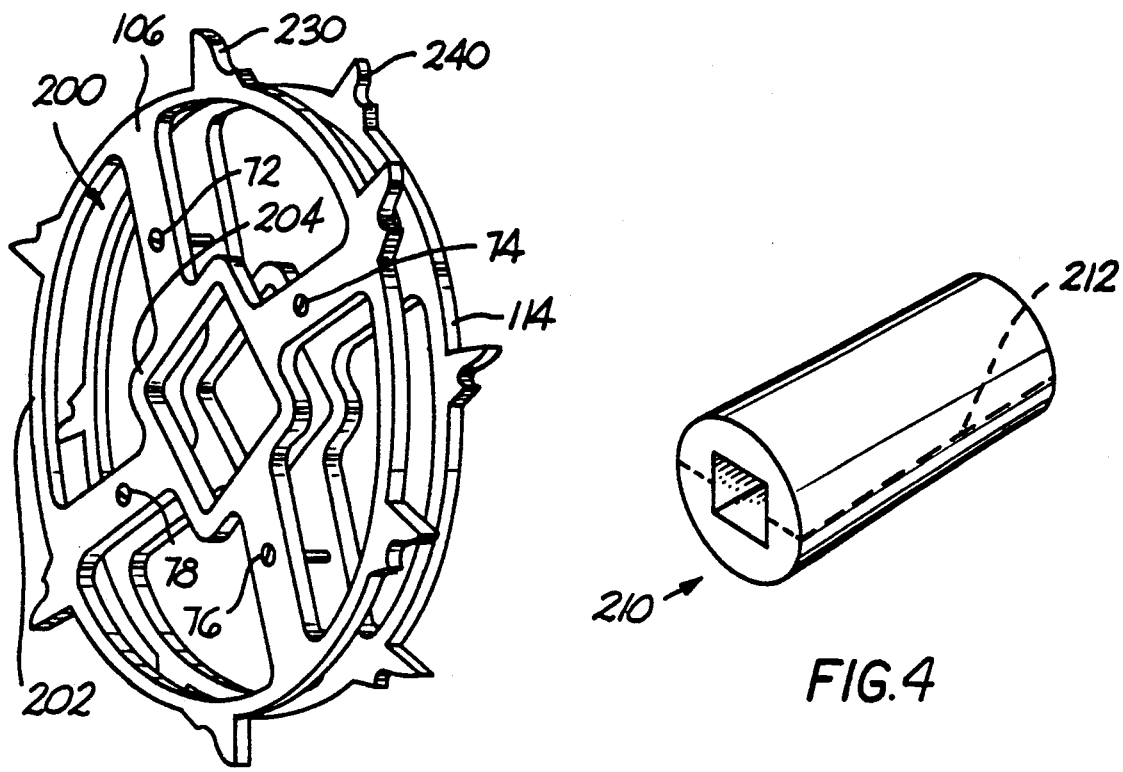
FIG.3
FIG.4
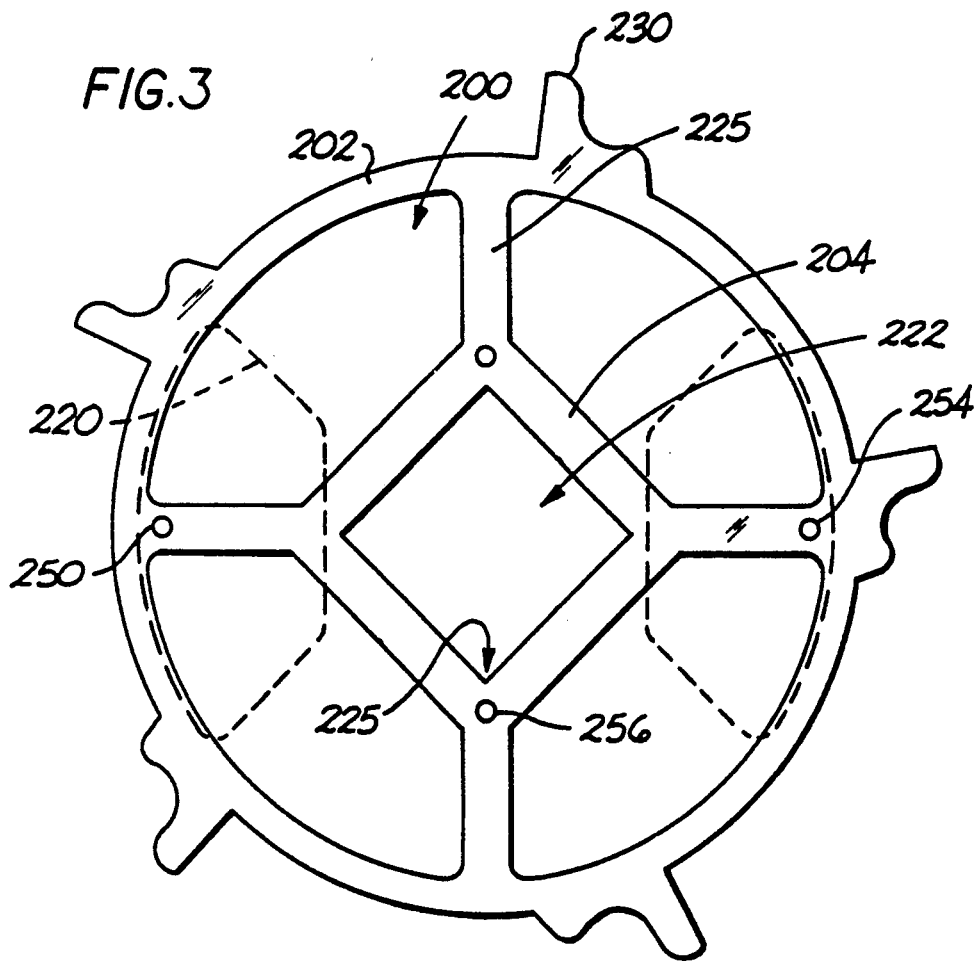
FIG.5

DRIVE SPROCKET SYSTEMS FOR REGISTRATION OF SPACED METAL LAMINATIONS ACROSS THE WIDTH OF PLASTIC CONVEYOR BELTS

This application is a continuation-in-part of co-pending application of the same assignee, 07/774,353 filed Oct. 10, 1991 for LAMINATED METAL SPROCKET FOR PLASTIC MODULAR CONVEYOR BELT SYSTEMS now U.S. Pat. No. 5,170,883, Dec. 5, 1991, which was in turn a continuation-in-part of 07/529,511 filed May 29, 1990, now U.S. Pat. No. 5,074,406, Dec. 24, 1991 for LAMINATED SPROCKET.

TECHNICAL FIELD

This invention relates to laminated metal sprockets for driving plastic conveyor belts and more particularly it relates to registration of spaced metal laminations with a set of plastic belt drive surfaces disposed across the width of the belt.

BACKGROUND

Laminated metal sprockets positioned on rotatable drive shafts for driving plastic modular belts are introduced in the related parent U.S. Pat. No. 5,074,406, Dec. 24, 1991 and U.S. Pat. No. 5,156,263, Oct. 20, 1992.

Operational experience with metal sprocket driving systems for plastic modular belts has indicated various unsolved problems pertinent to belt system operating life and reliability under dynamic operating conditions frequently encountered.

Because of the relatively flexible character of plastic modular conveyor belts, the belts tend to sag, expand and contract with temperature, and vary in response to aging and loading, as contrasted with the relative stability and firmness of metal sprockets located on metal drive shafts. For example, lateral movement of the belt during operation can cause frictional loading and corresponding undesirable interference and wear because of mismatches in registration of metal sprockets with corresponding belt drive surfaces. The probability that changes of dimension is non-uniform across the belt width gives further problems of producing reliable belt drive systems operable under changing and variable dynamic conditions. Thus, individual sprocket drive lamina generally behave differently across the width of the belt in the presence of curvature in belt drive systems, loading imbalances across the belt, and the influence of railings at the belt edges.

The softer plastic modules are subject to wear from the harder metal drive sprockets. To reduce wear induced from belt stops and starts, it is important to keep the weight and inertia of metal drive sprockets low particularly when encountering variable speed or stop and go operating conditions. Thus, operating life is extended by employment of light weight sprocket systems.

Conveyor belts come in many variations, depending upon loading, speeds, widths, adaption for curvature of conveyor paths, and the like. These factors not only affect the variations of belt dimensions and the wear as aforesaid, particularly where heavy drive forces are required for high belt loads, but also demand significant differences in drive sprocket configurations. Thus, heavier loaded belts in general require more sprocket laminations dispersed across the width of a belt, and possibly different numbers of laminations in different drive positions across the belt width. Therefore a belt sprocket drive system needs to be modularized and flexible in configuration to avoid the necessity to design and inventory a variety of seldom used drive systems adapted to different ranges of belt functions.

Another problem is encountered in initial registration of a laminar type metal sprocket drive system with belt drive surfaces across a conveyor belt width. The lamina must be critically spaced axially along the drive shaft to register with drive surface apertures dispersed over the width of the conveyor belt. Once registered, the sprocket lamina may be maintained laterally in registration by the mating belt drive surface structure when the sprocket lamina are freely axially movably positioned to float on the drive shaft. However, the initial manual assembly of a drive system is awkward and tedious, particularly with wide belts having several lamina critically spaced over the belt width in ganged relationship.

It is therefore an objective of this invention to provide improved conveyor belt metal sprocket drive systems resolving the foregoing problems.

Other objects, features and advantages of the invention will be found throughout the following description, drawings and claims.

DISCLOSURE OF THE INVENTION

The belt drive sprocket provided by this invention has a plurality of metal sprocket lamina of predetermined thickness formed from a disc like member with a non-circular, for example square, drive aperture. The lamina are coaxially positioned about the axis of rotation of the sprocket in an axially spaced set. Peripherally oriented driving sprocket tooth surfaces are spaced at selected angular positions around the axis of rotation to form a set of metallic driving surfaces on each lamination. The laminations are formed from metal plates or sheet metal, preferably by laser cutting or stamping.

Each drive lamination preferably has cut thereinto an angularly positioned set of cut out apertures thereby forming a skeleton framework serving to reduce the weight and inertia of the system to better react to dynamic operating conditions thus reducing wear and friction under stop and go cycles, for example.

The sprocket lamina are useful in various embodiments and configurations formed across the width of modular plastic belts to provide mating drive surfaces, either as spaced single drive lamina or in rigid ganged groupings. Spacer lamina or the like are used between sprocket drive lamina for producing rigid groupings. The stacked and aligned lamina of rigid groups may be registered laterally across the width of a belt in various ways, such as by interspersed light weight laminar axial spacing plates interlocked in place with adjacent sprocket lamina.

The improved flexible drive system of this invention is adaptable to a wide variety of belt conditions. It has a belt with a set of drive surfaces disposed across its width for mating engagement with a corresponding set of metal drive sprocket lamina disposed axially on a rotary drive shaft. The drive lamina are axially spaced for displacement along the drive shaft for mating registration into the belt drive surfaces by ganging means that retains a relative spacing between sprocket lamina, but permits lamina both singly and in unison to float along the shaft axis for dynamically following variations in belt characteristics occurring during dynamic operation.

Accordingly an improved, long life metal sprocket driven modularized conveyor belt system is achieved with the improved versatile drive system afforded by this invention.

BRIEF DESCRIPTION OF THE DRAWINGS:

In the drawings like reference characters designate similar features throughout the several views to facilitate comparison.

FIG. 3 is a perspective view of a sprocket drive embodiment with two laminar sprocket elements ganged by appropriate spacers;

FIG. 4 is a perspective view of a removable spacer for positioning on a square shaft between adjacent laminar drive elements;

FIG. 5 is a plan view of a further sprocket lamination element embodiment;

THE PREFERRED EMBODIMENTS

Figure 1:
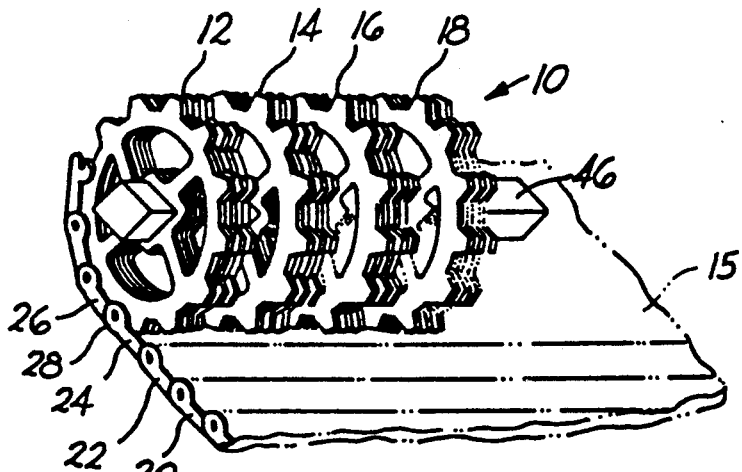
FIG. 1 is a perspective fragmental view of a plastic modular conveyor belt engaged by a laminated sprocket drive assembly positioned on a square driving shaft.

In FIG. 1 the belt drive system sprocket assembly 10 is mounted on square rotary shaft 46 for driving the modular plastic conveyor belt 15 by mating engagement of laminar sprocket tooth assemblies 12, 14, 16, and 18 with corresponding drive surfaces on the belt modules 20, 22, 24, and 26 each pivoted about a pivot rod 28 in the conveyor belt assembly. The sprocket is formed of laminar metal sprocket elements, which may be grouped and spaced along the axis of the drive shaft 46 in various configurations to meet a wide variety of belt configurations.

Figure 2:
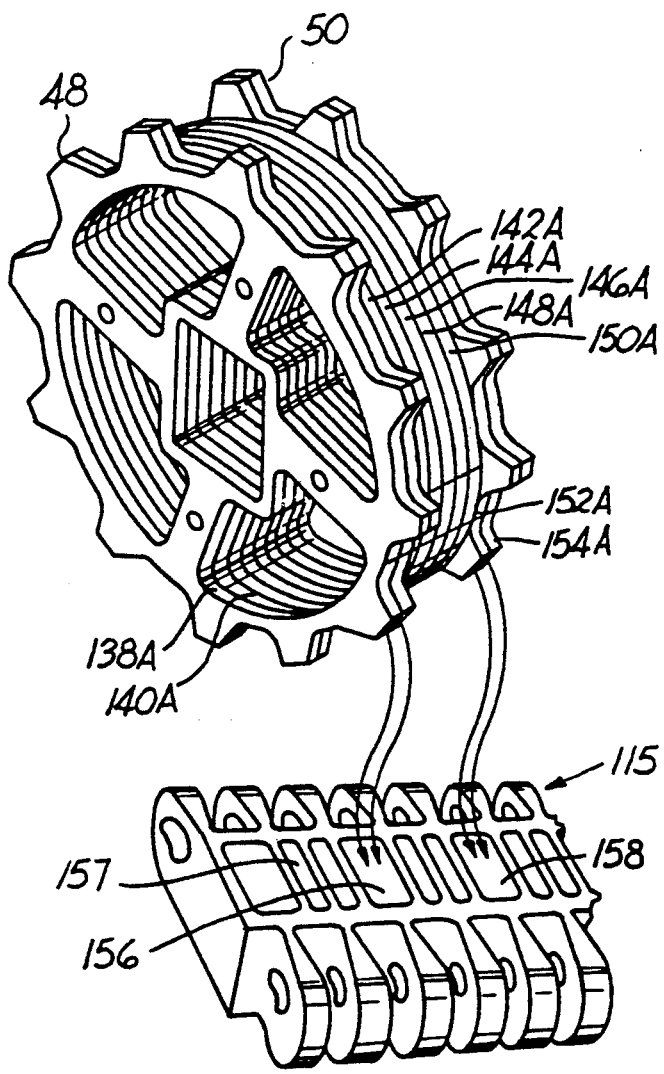
FIG. 2 is a perspective exploded view showing a set of drive surfaces in the plastic belt modules for mating with laminar sprocket teeth in predetermined positions across the belt width.

As previously set forth, and as better illustrated in the configuration of FIG. 2, there is a critical driving relationship between the sprocket teeth and the plastic belt modules which encourages wear by variations of belt dimensions and by dynamic drive conditions causing lateral displacement of belt drive surfaces. Other significant wear occurs when the metal sprocket laminar assembly is heavy and subject to high inertia when belts are stopped and started routinely or under emergency conditions. Thus, the sprocket system laminations are of a "skeleton" type construction for lighter weight and longer belt wear.

Also the substantially fixed spacing between the sprocket tooth subassemblies 48, 50 which must register with apertured belt drive surfaces 156, 158, here illustrated, can cause friction and wear because the plastic module 115 does not expand and contract identically with the metal sprocket drive assembly, and other lateral belt movements. Modular interaction found in various types of modular construction can cause the drive surfaces to dynamically change under loading, curvature paths and the like. This embodiment exemplifies the versatility of sprocket drive systems formed with the laminar elements of this invention, which can be assembled to conform to different belt drive surface configurations across the width of a belt and to belts of different loading and dynamic characteristics.

In this particular FIG. 2 configuration, two stacked drive lamina 138A and 140A are followed by five spacer lamina 142A, 144A, 146A, 148A and 150A, which in turn are followed by two more drive tooth lamina 152A and 154A. Thus, the drive sub-assemblies 48 and 50 Will mate into the wider belt drive surfaces 156 and 158 in the module 115. For driving lighter belt loads, for example, single lamina could mate into narrow drive surfaces 157. It is clear therefore that a modular system of laminar drive sprocket construction as afforded by this invention will provide great versatility for use in belts of different construction and furthermore as later made more clear, will additionally provide more reliable drive and belt systems under dynamic operating conditions.

FIG. 3 illustrates the light weight low-inertia assembly construction possibilities using the metal laminar sprocket drive elements 106 and 114. Spacer means for this simplified and representative embodiment are the light weight screws 72, 74, 76, 78 which hold the two elements 106 and 114 a fixed distance apart.

The primary reason for spacers between the drive lamina 106, 114, etc. is to locate them axially along the drive shaft for registration with belt driving surfaces disposed across the belt width. In some belt drive systems it is desirable to let some of the individual lamina float axially on the drive shaft to allow for belt expansion and contraction, loading unbalances, and other types of distortion incurred under dynamic conditions such as curvature of the belt path, and influence of edge railings, etc., which may cause the belt to tend to shift or wander laterally.

The temporary spacer embodiment 210 of FIG. 4 shows two halves of a generally cylindrical shaft overlay assembly, with the two halves identified at line 212. Accordingly, during assembly of the belt with the sprocket system, the spacer 210 can be temporarily installed on the square shaft to gauge the desired predetermined spacing between adjacent sprocket lamination elements at opposite ends for assuring mating registration in corresponding belt drive surfaces. The belt after proper mating then maintains the sprocket laminations in place during belt movement. The laminations may float on the square shaft to conform with the dynamic lateral distortions of the belt after the temporary spacer 210 is removed and the belt is driven. This temporary type of spacer is suitable for use when the sprocket system does not require a more rigid stacked and ganged laminar assembly, and where floatation of the sprocket laminations on the shaft is desirable to conform with dynamic conditions of belt operation.

In the FIG. 5 embodiment, cut-out apertures 200, preferably cut by means of a laser cutting tool, provides blanks 220. These blanks 220, when used as spacers between drive laminations 202, advantageously reduce the weight and inertia of the metal sprocket drive system, and eliminates the expense of forming the more complex spacer lamina of the FIG. 2 embodiment, for example. These blanks 220 may be welded or otherwise affixed in place on opposite sides of the drive shaft and sprocket lamination, such as shown in dotted line format.

In this embodiment, the rim 204 about the substantially square drive apertures 222 is coupled to the circumferential rim 202 by means of radial coupling links 225 extending from the four apices 228 of the square. This produces cut-out apertures 200 and corresponding blanks 220 of substantially trapezoidal shape. Also this drive lamination configuration 202 provides the advantage of offsetting the drive tooth surfaces 230, 240 of adjacent drive lamina with a single lamination configuration. This is achieved by simply reversing the lamina to register at the bolt apertures 250, 252, 254, 256.

It is clear that this invention has contributed improved methods and drive system for operating a plastic modular conveyor belt system having a plurality of belt drive surfaces disposed across a predetermined width of the belt by employing metal drive sprocket lamina. Thus, metal sprocket drive lamina of predetermined thickness are produced from metal discs by removing a set of apertures of predetermined shape from the discs to form a lighter weight skeleton embodiment of the sprocket elements. A plurality of such metal drive lamina defining a non-circular drive aperture about an axis of rotation and presenting a plurality of driving surfaces radially disposed about the laminations are disposed across the width of the belt while the laminations are retained in a spaced relationship to register the metal sprocket driving tooth surfaces into corresponding plastic belt drive surfaces in an improved long life relationship.

Figure 6:
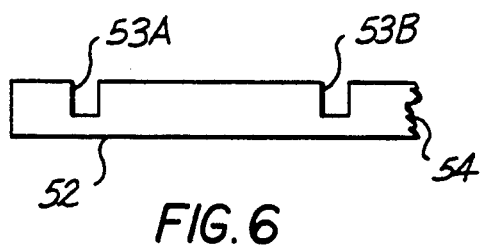
FIG. 6 is a side view of a lamination type spacer bracket for holding sprocket elements in relative spaced positions across the width of the belt.
Figure 7:
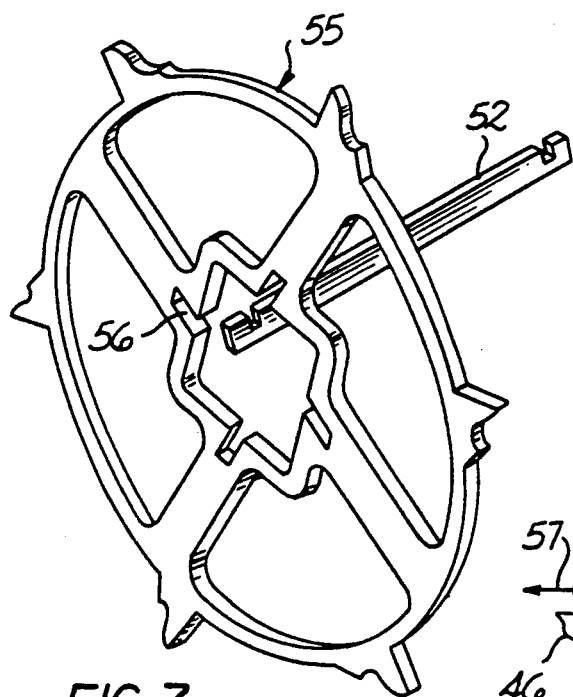
FIG. 7 is a perspective sketch of a partially assembled sprocket drive being readied for mounting on the drive shaft.

The ganging spacer 52 of FIG. 6 comprises a light weight lamination for installation adjacent the drive shaft 46 to extend axially therealong and position sprocket drive lamina in slots 53A and 53B, etc. This ganging spacer element 52 is readily conformed to different belt drive sprocket needs and serves to locate a plurality of drive sprocket elements 55 across the width of a belt to register with the corresponding belt drive surface configuration, and thus is indicated at 54 to be extensible for mounting different combinations of axially disposed drive sprocket laminar elements, such as 55.

The notches 53 provide interlocking structure with the slots 56 positioned adjacent the four planes of the square drive shaft in the laminar drive element 55. It is seen therefore that the ganging spacer 52 has its slot manually, or with an appropriate jig, positioned for interlocking into a sprocket slot 56 before placing on the drive shaft. The drive shaft then locks the ganging spacer 52 irremovably in place until the sprocket drive assembly is removed from the shaft. Thus the array of sprocket drive elements 55 are held in appropriate axial spacings along the driveshaft for mating with the corresponding belt drive surfaces. Typically there are four spacers 52 disposed on the four planar surfaces of a square shaft, but other shaft configurations and arrangements of the laminar spacers and interlocking structure can be adopted for similar functioning.

Figure 8:
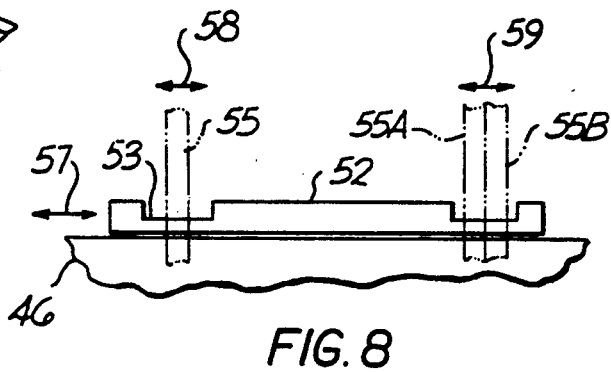
FIG. 8 is a side view sketch, partly in phantom, showing a sprocket system that dynamically floats on the drive shaft to adjust to variations of belt dimensions during operation.

The functional relationship of this ganged spacer unit is illustrated in FIG. 8, wherein the spacer 52 is shown by arrow 57 to be axially movable in a floating relationship on one surface of the shaft 46. Thus, the gang of drive sprockets 55 will as a unit dynamically conform to any lateral shifting of the belt encountered in operation, such as might tend to occur with unbalanced loads, etc.

Furthermore note that the spacer member 52 has slots 53 wider than the sprocket drive element 55, and can accommodate a group of side by side laminar elements 55A, 55B, so that the drive sprocket sections can individually or in groupings float for axial adjustment during dynamic belt operation as indicated by arrows 58, 59. Thus, it is seen that with uneven expansion or contraction of the belt width in response to temperature or load, the sprocket drive system will dynamically adapt for an optimum mating engagement of the metal sprocket elements 55 and the corresponding plastic belt drive surfaces. This avoids friction and wear on the belt.

Figure 10:
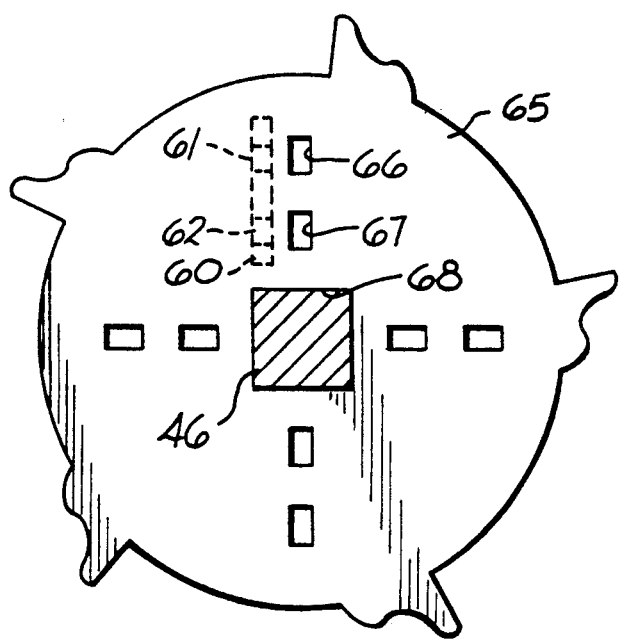
FIG. 10 is a plan view of a sprocket drive lamination into which the spacer bracket of FIG. 9 interlocks.
Figure 9:
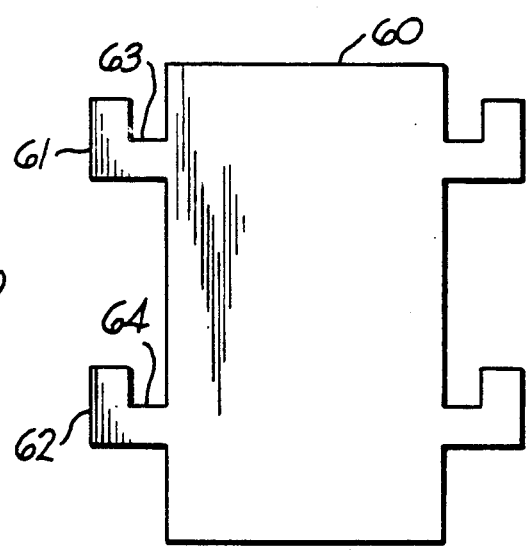
FIG. 9 is a plan view of a further lamination type spacer bracket for holding sprocket elements in relative spaced positions across the width of the belt.

As seen from FIGS. 9 and 10, the ganging spacer plate lamination 60 of different format has two radially disposed interlocking brackets 61, 62 with alongside notches 63, 64 that will interlock into corresponding apertures 66, 67 in a drive sprocket lamination 65 of large diameter. As shown in phantom in FIG. 10, the spacer 60 with interlocked brackets 61, 62 in the apertures 66, 67 will ride upon the surface 68 of drive shaft 46 in the assembled drive system. Thus, the dynamic functioning is similar to that illustrated in FIG. 8.

Having therefore improved the state of the art, those features of novelty relating to the spirit and nature of the invention are set forth with particularity in the following claims.

I claim:

1. In a drive system for a plastic modular conveyor belt having a plurality of belt drive surfaces formed by belt modules and spaced in positions across a predetermined width of the belt for driving with a sprocket drive mechanism, the improved sprocket drive structure, comprising in combination:
   a rotatable drive shaft for said belt,
   metal drive sprocket lamina structure for mating in at least two corresponding ones of said spaced belt drive surfaces mounted on said drive shaft for rotation therewith,
   spacing means axially disposed along said shaft between a least two drive sprocket lamina structures to separate the lamina structure a predetermined distance for registering the lamina structure into corresponding belt drive surfaces, and
   said spacing means comprising shaft-to-drive sprocket contacting means for spacing by contact at interlocking joints with said two spaced sprocket lamina the drive surfaces at a distance for registering with the belt drive surfaces and for permitting one said drive sprocket lamina structure in registration with the belt to float relative to the other drive sprocket lamina structure for axial movement along said shaft.

2. The drive system of claim 1 wherein said interlocking joints lock the spacing means and adjoining interlocked drive sprocket lamina structure together to move in unison.

3. The drive system of claim 2 wherein the interlocking structure comprises slots radially extending from said drive shaft into said drive sprocket lamina structure, and the spacing means comprises a set of axially oriented laminar plates disposed about said shaft having mating end structure with a mating slot for interfitting into said slots in the sprocket lamina structure of at least two sprocket lamina before positioning on said shaft to thereafter move together axially on the shaft in an interlocked position with said shaft and the spacer juxtaposed to radially interlock the sprocket lamina with the spacing means to separate sprocket lamina disposed on the spacer means by a fixed axial spacing relationship.

4. The drive system of claim 1 wherein the spacer means comprise two axially disposed parts in contact with the shaft for disposing two adjacent sprocket lamina elements axially apart a predetermined distance and said two parts fitting the spacer means removably on said drive shaft.

5. In a drive system for a plastic modular conveyor belt having a plurality of belt drive surfaces spaced from each other and positioned across a predetermined width of belt for driving from a powered rotatable drive shaft carrying a sprocket drive mechanism, the improvement comprising, a set of sprocket drive members formed of spaced laminar sprocket elements of at least one metal lamination forming at least one sprocket drive member axially disposed on said shaft, inter-joining means for disposing at least part of said sprocket drive members axially movable along the drive shaft for rotation by the shaft to drive the belt by mating drive contact of the sprocket members with corresponding ones of said belt drive surfaces, and spacing means arranged circumferentially about the drive shaft and in contact with at least two adjacent sprocket drive members at interlocking joints for positioning said sprocket drive members apart axially a predetermined distance along said drive shaft for spacing in mating position for initial engagement with said corresponding belt driven surfaces, said spacing means being adapted for permitting lateral axial movement of at least one sprocket drive member with a belt relative to another sprocket drive member when driven by the sprocket drive members as the belt retains the sprocket members in mating position, whereby said at least one sprocket drive member follows deviations of a mating belt drive surface axially along the shaft by individual dynamic axial adjustment of position along the shaft as the belt is driven.

6. The method of operating a plastic modular conveyor belt system having a plurality of belt drive surfaces disposed across a predetermined width of the belt for engagement with mating drive sprocket member surfaces formed of at least one lamination to present a set of separated drive sprocket members disposed axially along a drive shaft, comprising the steps of:

forming drive sprocket member laminations of metal, mounting at least one of said drive sprocket members to move axially on the drive shaft, introducing a spacer in contact with and between at least two drive sprocket members disposed on the drive shaft at interlocking joints for spacing the sprocket members apart and registering individual drive sprocket member surfaces into belt drive surfaces positioned across the belt, and providing spacer structure operable with the belt and sprocket drive surfaces mated for permitting said at least one lamination to float dynamically axially on the drive shaft relative to another lamination while being retained in mating driving engagement by engagement with the belt drive surface.

7. An improved drive system for plastic modular conveyor belts, comprising in combination:

a plastic conveyor belt of predetermined width having disposed across its width a set of belt drive surfaces, a set of laminar metal drive sprocket elements for mating in driving relationship with at least some of said belt drive surfaces across the width of the belt, a rotary drive shaft adapted to mount thereon in a plurality of axial positions for registration across the width of the belts said set of laminar metal drive sprocket elements, and ganging structure for holding at least two of said metal drive elements in axially spaced displacement along said drive shaft for registration into corresponding said belt drive surfaces with freedom to move laterally along the shaft with the belt while the belt is driven.

* * * * *